May 25, 1943. J. M. NEWMAN Re. 22,324
CONTROL SYSTEM
Original Filed April 25, 1941
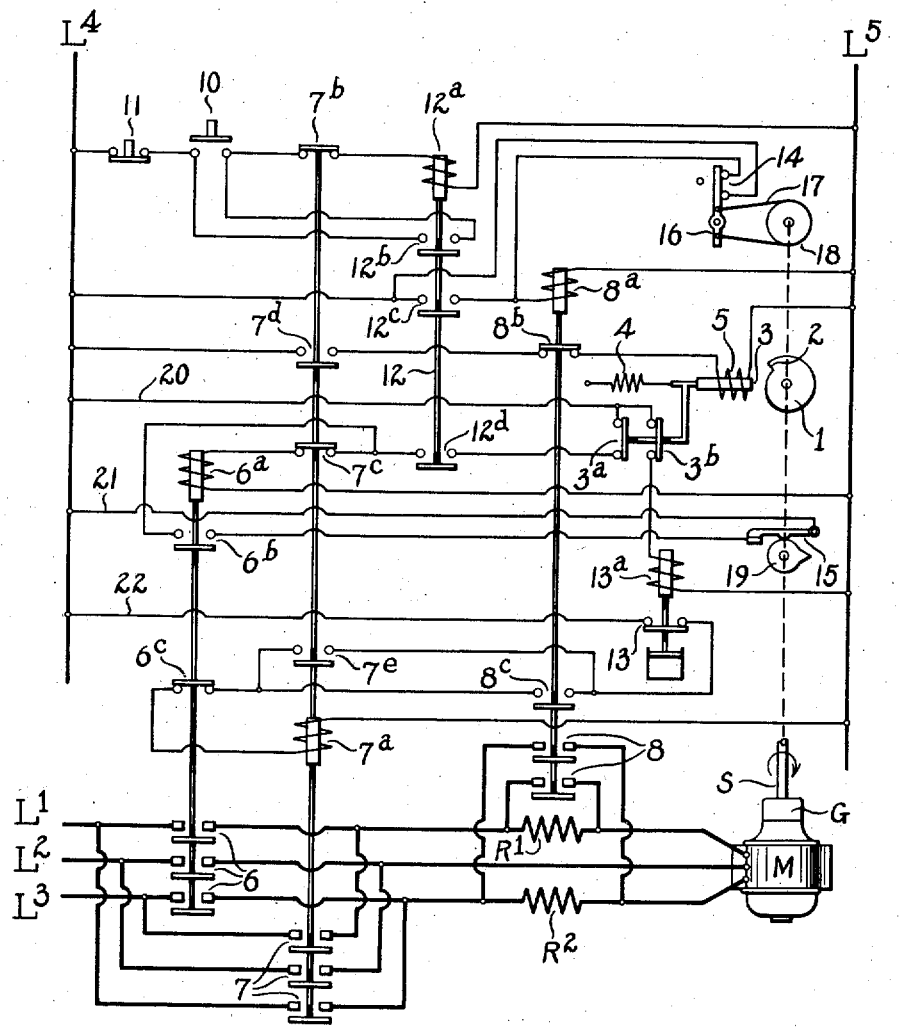
Inventor
John M. Newman
By Frank H. Hubbard
Attorney Reissued May 25, 1943 Re. 22,324

UNITED STATES PATENT OFFICE 22,324

CONTROL SYSTEM

John M. Newman, Wauwatosa, Wis., assignor to Cutler-Hammer, Inc., Milwaukee, Wis., a corporation of Delaware Original No. 2,308,709, dated January 19, 1943, Serial No. 390,221, April 25, 1941. Application for reissue March 25, 1943, Serial No. 480,518

8 Claims. (Cl. 192—142)

This invention relates to control systems, and while not limited thereto is particularly applicable to controllers for motor driven machines such as crank shaft lathes.

Motor driven machines of various types as for example lathes employed in the manufacture of automobile crank shafts require a controller which provides for quick and accurate stopping of a driven part such as a rotating spindle in a given angular position, and the present invention has among its objects to provide an improved controller which meets this requirement.

Another object is to provide a controller for machines of the aforesaid type having an automatic stop mechanism which is positive and reliable in operation and effects exceedingly quick and accurate stopping of the rotating spindle without subjecting the driving mechanism to excessive shock.

Another object is to provide a controller of the aforesaid character which operates to effect quick and accurate stopping of the driven machine under varying load conditions and regardless of wide voltage variations in the supply circuit of the driving motor.

Various other objects and advantages of the invention will hereinafter appear.

The accompanying drawing diagrammatically illustrates a control system embodying the invention which will now be described, it being understood that the system illustrated is susceptible of modification without departing from the spirit and scope of the appended claims.

Referring to the drawing, the same illustrates a three phase alternating current motor M for driving a spindle S of a machine such as a crank shaft lathe through the medium of speed reducing gearing indicated generally by reference character G. Spindle S of the driven machine has a stop mechanism associated therewith comprising a member 1 which is fixed to said spindle and is provided with a radial stop surface 2 to be engaged by a pin 3 for stopping of said spindle in a given angular position during rotation thereof in reverse direction. Pin 3 is normally held out of engagement with member 1 by a spring 4 and is provided with an operating winding 5 for moving the same into engagement with said member.

Two normally open three pole electromagnetic switches 6 and 7 are provided for selectively establishing forward and reverse power connections for motor M from a supply circuit indicated by lines $L^1$, $L^2$ and $L^3$, and a normally open two pole electromagnetic switch 8 is provided for shunting torque reducing resistors $R^1$ and $R^2$ connected in the primary circuit of said motor.

For a purpose hereinafter set forth pin 3 of the stop mechanism has two sets of normally closed contacts $3^a$ and $3^b$ associated therewith which are opened upon movement of said pin into the path of stop surface 2. Also for purposes hereinafter set forth switch 6 is provided with a set of normally open auxiliary contacts $6^b$ and a set of normally closed auxiliary contacts $6^c$; switch 7 is provided with two sets of normally closed auxiliary contacts $7^b$ and $7^c$ and two sets of normally open auxiliary contacts $7^d$ and $7^e$ and resistance control switch 8 is provided with a set of normally closed auxiliary contacts $8^b$ and a set of normally open auxiliary contacts $8^c$.

In addition to the aforedescribed control elements the control system includes a normally open start push button 10, a normally closed stop push button 11, an under-voltage relay 12, an electroresponsive timing relay 13, a plugging relay 14, and a normally closed indexing switch 15.

Under voltage relay 12 is provided with three sets of normally open contacts $12^b$, $12^c$ and $12^d$. Relay 13 is movable into closed position by an operating winding $13^a$ and is provided with means such as a dash pot for delaying opening thereof.

Plugging relay 14 is of a conventional type, the same being provided with a pivoted switch member 16 which is controlled by motor M through the medium of a friction drive including a belt 17 and a pulley 18. Pulley 18 is preferably driven at a speed corresponding to that of motor M and belt 19 is connected to switch member 16 on opposite sides of its pivot and frictionally engages said pulley to hold said switch member in circuit closing position during rotation of motor M in its forward direction and to move said switch member into circuit opening position immediately upon reversal of said motor.

Indexing switch 15 is biased toward circuit closing position and a cam 19 driven by spindle S provides for momentary opening of said switch upon rotation of said spindle through a predetermined angular position.

The operation and circuit connections of the above described control system will now be more fully described.

Depression of start push button 10 connects the operating winding $12^a$ of under-voltage relay 12 across a supply circuit indicated by lines $L^4$ and $L^5$ through the medium of stop push button 11, and the normally closed auxiliary contacts $7^b$ associated with switch 7. Under-voltage relay 12 then responds and the contacts $12^b$ thereof establish a shunt circuit around push button 10 to maintain operating winding $12^a$ energized upon release of said start push button. Also upon response of relay 12 the contacts $12^c$ thereof connect the operating winding $8^a$ of resistor control switch 8 across Lines $L^4$ and $L^5$ and the contacts $12^d$ thereof establish an energizing circuit for switch 6 extending from line $L^4$ by conductor 20, through contacts $3^a$ associated with locking pin 3, through contacts $12^d$ of relay 12, through contacts $7^c$ associated with switch 7 and through the operating winding $6^a$ of switch 6 to line $L^5$. Thus immediately upon response of under-voltage relay 12 resistor control switch 8 responds to exclude resistances $R^1$ and $R^2$ from the primary circuit of motor M and switch 6 responds to connect said motor to lines $L^1$, $L^2$ and $L^3$ for operation thereof at full speed in its forward direction.

As will now be set forth, depression of stop push button 11 causes automatic stopping of spindle S in a predetermined angular position. Upon depression of stop push button 11 the aforedescribed maintaining circuit for under-voltage relay 12 is interrupted and said relay then drops out to interrupt the aforedescribed energizing circuits for switches 6 and 8. However, upon opening of the contacts $12^c$ of relay 12 resistance control switch 8 is maintained energized through the medium of plugging relay 14. Also upon opening of contacts $12^d$ of relay 12 switch 6 is adapted to be maintained energized by a circuit extending from line $L^4$ by conductor 21, through indexing switch 15, through contacts $6^b$ of said switch, through normally closed contacts $7^c$ associated with switch 7, and through the operating winding $6^a$ of switch 6 to line $L^5$. Switch 6 is thus maintained energized pending opening of indexing switch 15 by movement of spindle S through a given angular position. As will now be set forth, upon interruption of the maintaining circuit for switch 6 by indexing switch 15 the switch 7 is immediately energized to effect plugging of motor M.

The operating winding $13^a$ of relay 13 is normally connected across lines $L^4$—$L^5$ by contacts $3^b$ associated with locking pin 3 to maintain said relay in closed position. Immediately upon dropping out of switch 6, switch 7 is energized by a circuit extending from line $L^4$, by conductor 22, through relay 13, through auxiliary contacts $8^c$ associated with resistance control switch 8, through auxiliary contacts $6^c$ associated with switch 6, and through the operating winding $7^a$ of switch 7 to line $L^5$. Response of switch 7 reverses the power connections to motor M to effect plugging thereof and since resistance control switch 8 is maintained in closed position to shunt resistances $R^1$ and $R^2$ motor M is subjected to maximum retarding torque to bring the same from full speed to zero speed within one revolution of spindle S. Indexing switch 15 is so set with respect to spindle S that under varying load conditions on said spindle and regardless of wide voltage variations in the supply circuit $L^1$, $L^2$, $L^3$ said switch opens at a point which provides for zero speed of motor M when the stop surface 2 on member 1 moves in a clockwise direction slightly beyond pin 3. After motor M is brought to zero speed the same begins to rotate in its reverse direction and plugging relay 14 then opens to interrupt the maintaining circuit for resistance control switch 8. Switch 8 in dropping out inserts resistances $R^1$ and $R^2$ in the primary circuit of motor M to provide for operation of said motor in its reverse direction under a reduced torque, switch 7 being maintained energized through the medium of its associated contacts $7^e$. Also immediately upon dropping out of resistance control switch 8 the contacts $8^b$ thereof close to connect the operating winding 5 of stop mechanism 1 across lines $L^4$, $L^5$ through the medium of auxiliary contacts $7^d$ associated with switch 7, and locking pin 5 is thus moved into engagement with member 1. Upon rotation of spindle S in its counterclockwise direction the stop surface 2 on member 1 engages pin 3 to effect positive stopping of said spindle in a predetermined angular position without undue shock since the motor is then operating under reduced torque.

Upon movement of locking pins 5 into the path of stop surface 2 the contacts $3^b$ associated with said locking pin are moved into open position to interrupt the energizing circuit for relay 13, and said relay then acts after a predetermined relatively short period of delay to interrupt the above described energizing circuit for reversing switch 7. Dropping out of switch 7 interrupts reverse power connections for motor M and also upon dropping out of said switch the contacts $7^d$ thereof interrupt the energizing circuit for operating winding 5 of pin 3 to provide for restoration of said pin to normal position under the action of spring 4.

What I claim as new and desire to secure by Letters Patent is:

1. The combination with a rotatable spindle and a reversible driving motor therefor, of a stop on said spindle, a stop engaging element movable into and out of the path of said stop, power control means for said motor for effecting operation thereof in forward direction and for thereafter plugging the same and effecting reversal thereof, means for maintaining said element out of the path of said stop during forward operation of said motor and for moving said element into the path of said stop upon initial rotation of said motor in its reverse direction, and means rendered operative by movement of said element into the path of said stop for deenergizing said motor.

2. The combination with a rotatable spindle and a driving motor therefor, of a stop on said spindle, an element for engaging said stop, said element being normally held out of the path of said stop and having an operating winding associated therewith for moving the same into the path of said stop, means for establishing and interrupting forward power connections for said motor and for automatically establishing reverse power connections for plugging and reversal of said motor upon interruption of said forward power connections, means operable upon initial rotation of said motor in its reverse direction for energizing said winding to move said element into the path of said stop for stopping of said spindle in a given angular position, and means for interrupting reverse power connections for said motor upon movement of said element into the path of said stop and for restoring said element to normal position upon interruption of said reverse power connections.

3. The combination with a rotatable spindle and a driving motor therefor, of a stop on said spindle, an element normally held out of the path of said stop and having an operating winding associated therewith for moving the same into the path of said stop for stopping of said spindle in a given angular position, means for establishing forward power connections for said motor and for interrupting such connections but only upon rotation of said spindle through a predetermined angular position, means acting upon interruption of said forward power connections for automatically establishing reverse power connections for said motor to effect plugging and reversal thereof, means operable upon initial rotation of said motor in its reverse direction for energizing said winding for movement of said element into the path of said stop, and means for interrupting reverse power connections for said motor upon movement of said element into the path of said stop and for restoring said element to normal position upon interruption of said reverse power connections.

4. The combination with a rotatable spindle and a driving motor therefor, of a stop on said spindle, a stop engaging element normally held out of the path of said stop, means for establishing and interrupting forward power connections for said motor and for automatically establishing reverse power connections for plugging and reversal of said motor upon interruption of said forward power connections, means operable upon initial rotation of said motor in its reverse direction for reducing the torque of said motor to delay acceleration thereof and for also moving said element into the path of said stop for positive stopping of said spindle in a given angular position, and means for interrupting reverse power connections for said motor upon movement of said element into the path of said stop and for restoring said locking part to normal position upon interruption of said reverse power connections.

5. The combination with a rotatable spindle and a driving motor therefor, of a stop on said spindle, a stop engaging element normally held out of the path of said stop, means for establishing and interrupting forward power connections for said motor and for automatically establishing reverse power connections for plugging and reversal of said motor upon interruption of said forward power connections, means operable upon initial rotation of said motor in its reverse direction for moving said element into the path of said stop, means operable after a predetermined period of delay upon movement of said element into the path of said stop for interrupting reverse power connections for said motor, and means for restoring said locking part to normal position upon interruption of said reverse power connections.

6. The combination with a rotatable spindle and a reversible driving motor therefor, of a stop on said spindle, a stop engaging element movable into and out of the path of said stop, means for establishing and interrupting forward power connections for said motor and for automatically establishing reverse power connections for plugging and reversal of said motor upon interruption of said forward power connections, means for maintaining said element out of the path of said stop during forward operation of said motor and for moving said element into the path of said stop upon initial rotation of said motor in its reverse direction and means for reducing the torque of said motor upon initial rotation thereof in its reverse direction and for interrupting reverse power connections for said motor upon movement of said element into the path of said stop.

7. The combination with a rotatable spindle and a reversible driving motor therefor, of a stop on said spindle, a stop engaging element movable into and out of the path of said stop, means for establishing forward power connections for said motor and for interrupting such connections but only upon rotation of said spindle through a predetermined angular position, means acting upon interruption of said forward power connections for automatically establishing reverse power connections for said motor to effect plugging and reversal thereof, means for maintaining said element out of the path of said stop during forward operation of said motor and for moving said element into the path of said stop upon initial rotation of said motor in its reverse direction and means rendered operative by movement of said element into the path of said stop for deenergizing said motor.

8. The combination with a rotatable spindle and a reversible driving motor therefor, of a stop on said spindle, a stop engaging element movable into and out of the path of said stop, means for establishing forward power connections for said motor and for interrupting such connections but only upon rotation of said spindle through a predetermined angular position, means acting upon interruption of forward power connections for said motor for automatically establishing reverse power connections for said motor to effect plugging and reversal thereof, means operable upon initial rotation of said motor in its reverse direction for reducing the torque of said motor and for also moving said element into the path of said stop, and means for interrupting reverse power connections for said motor upon movement of said element into the path of said stop.

JOHN M. NEWMAN.